(12) United States Patent
Leonardi

(10) Patent No.: US 6,336,671 B1
(45) Date of Patent: Jan. 8, 2002

(54) JACK STORAGE ASSEMBLY

(76) Inventor: Hugo Leonardi, 2208 Dryden Rd., Metamora, MI (US) 48445

(*) Notice: Subject to any disclaimer, the term of this patent is extended or adjusted under 35 U.S.C. 154(b) by 0 days.

(21) Appl. No.: 09/713,713

(22) Filed: Nov. 15, 2000

(51) Int. Cl.$^7$ ................................................ B62D 43/06
(52) U.S. Cl. .................. 296/37.3; 296/37.2; 224/42.13; 224/42.14; 224/42.2; 224/42.24; 224/42.26; 224/539
(58) Field of Search ............................... 296/37.2, 37.3; 224/42.14, 42.13, 42.2, 42.24, 42.26, 539

(56) References Cited

U.S. PATENT DOCUMENTS

| | | | | |
|---|---|---|---|---|
| 4,498,614 A | * | 2/1985 | Guarr ........................ 224/42.24 |
| 4,687,124 A | * | 8/1987 | Mahr ........................ 224/42.24 |
| 5,118,017 A | * | 6/1992 | Buck ........................ 224/42.13 |
| 5,429,285 A | * | 7/1995 | Kim ........................ 224/42.14 |
| 5,447,110 A | * | 9/1995 | Brown ........................ 141/2 |
| 5,799,845 A | * | 9/1998 | Matsushita ................ 224/42.14 |
| 5,941,432 A | * | 8/1999 | Spencer et al. .......... 224/42.13 |
| 6,082,803 A | * | 7/2000 | Klueger ..................... 296/37.2 |

* cited by examiner

*Primary Examiner*—Stephen T. Gordon
*Assistant Examiner*—Lori L. Coletta
(74) *Attorney, Agent, or Firm*—Gifford, Krass, Groh, Sprinkle, Anderson & Citkowski, P.C.

(57) ABSTRACT

A jack storage assembly is provided for use in conjunction with an automotive vehicle having a wheel well for storage of a spare tire and in which the wheel well includes a bracket over which the spare tire is positioned. The assembly includes a bucket which is adapted to contain a jack, and the bucket is detachably secured to the bracket so that the spare tire is sandwiched in between the bucket and the wheel well. The cover is then positioned over the spare tire while a fastener is detachably secured to the bucket such that the cover is sandwiched in between the fastener and the bucket.

5 Claims, 3 Drawing Sheets

JACK STORAGE ASSEMBLY

BACKGROUND OF THE INVENTION

I. Field of the Invention

The present invention relates generally to a jack storage assembly for use with automotive vehicles.

II. Description of the Prior Art

Many automotive vehicles, such as cars, trucks, SUVs and the like, include a wheel well in which a spare tire is contained. A car jack is also typically contained within the wheel well while a cover overlies the wheel well thus covering the spare tire and jack.

In order to secure both the spare tire and the jack to the vehicle to prevent rattling, vibration and the like, typically an elongated bolt is detachably secured to the wheel well so that the bolt extends upwardly through the spare tire as well as the jack. A threaded fastener, such as a wing nut, then threadably engages the top end of the bolt in order to sandwich the wheel well cover in between the fastener and the wheel well.

This previously known assembly for storing both the spare tire as well as the jack, however, has not proven wholly satisfactory in use. One disadvantage of these previously known assemblies is that the bolt is detachably secured to the wheel well. As such, it has proven difficult to position the securing bolt within the wheel well such that the securing bolt is locked against rotation. Consequently, in many situations where the spare tire has been used, the tire which is positioned within the wheel well, whether it be the spare tire or the damaged tire, is not properly secured to the vehicle thus causing rattling and vibration during the operation of the motor vehicle.

SUMMARY OF THE PRESENT INVENTION

The present invention provides a jack storage assembly for automotive vehicles which overcomes all of the above-mentioned disadvantages of the previously known devices.

In brief, the jack storage assembly of the present invention comprises an inverted and generally U-shaped bracket which is secured to the bottom of the wheel well. This bracket is positioned such that the bracket extends upwardly through the hub of the tire which is positioned within the wheel well. The bracket also includes two outwardly extending tabs.

The jack storage assembly further includes a bucket adapted to contain an automotive jack. This bucket includes a bore at its lower end, and this bore includes a plurality of longitudinally spaced ribs formed around the interior of the bore. A pair of axially extending channels are formed through the ribs and these channels are dimensioned so that, with the tabs in the bracket positioned in registration with the channels, the bucket is freely axially slidably received over the bracket until a lower end of the bucket abuts against the spare tire hub. Rotation of the bucket substantially 90 degrees then moves the tabs in between adjacent ribs thus locking the bucket to the bracket against axial movement and securing the bucket and tire snugly to the wheel well.

Thereafter, a cover is positioned over the wheel well so that the cover overlies both the bucket and the spare tire. The cover includes a through opening which registers with an upper end of the bucket while a fastener then is detachably secured to the upper end of the bucket so that the cover is sandwiched in between the fastener and the bucket. Preferably, the fastener includes a bayonet coupling which is received within a bayonet opening at the upper end of the bucket.

Preferably, the bucket as well as the fastener is constructed of plastic for inexpensive yet durable construction.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
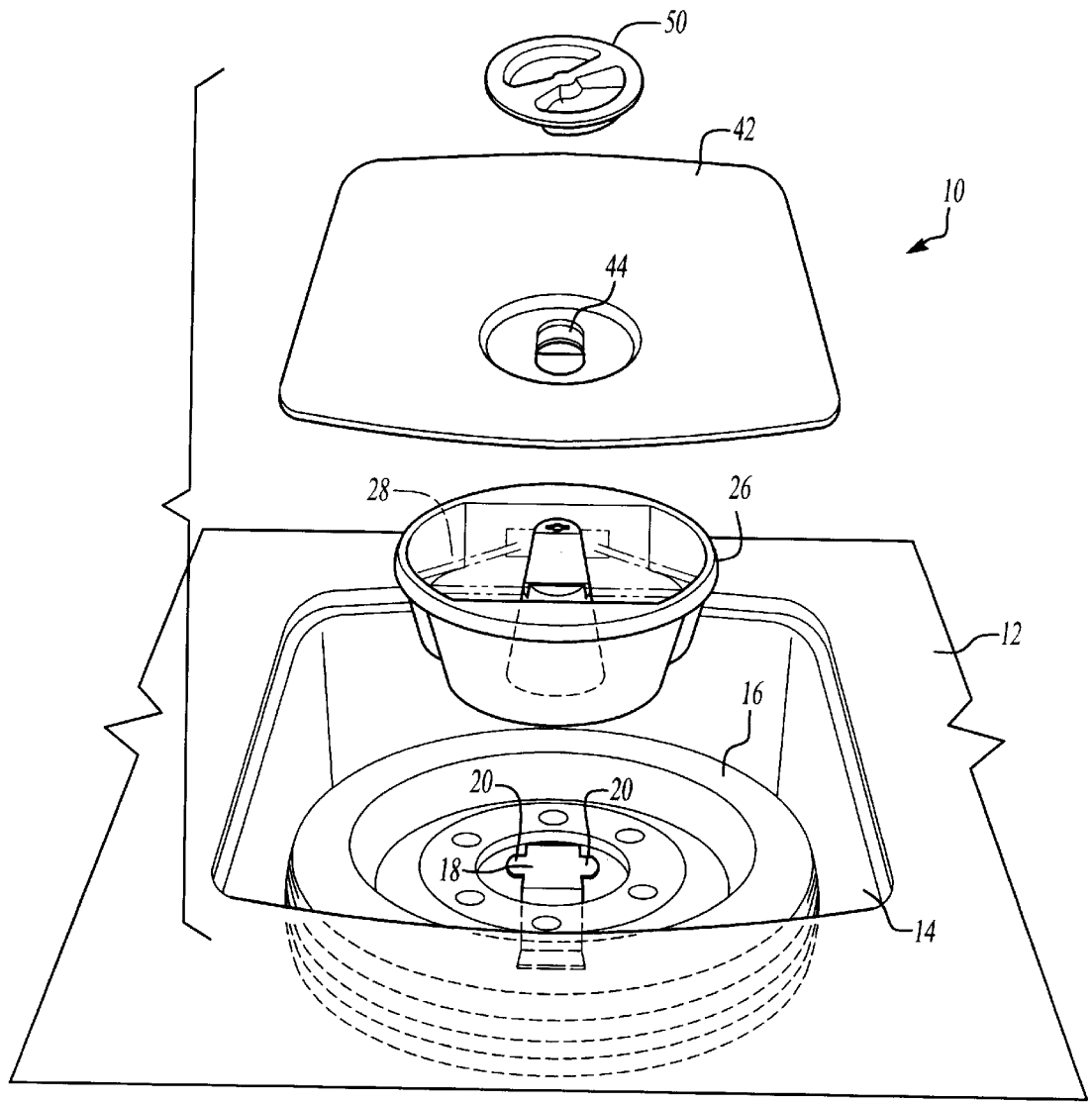
FIG. 1 is an exploded view illustrating a preferred embodiment of the present invention.

With reference first to FIG. 1, a preferred embodiment of the jack storage assembly 10 of the present invention is there shown for use with an automotive vehicle 12 (only a portion illustrated) having a wheel well 14. The wheel well 14 is dimensioned to contain a spare tire 16.

Figure 2:
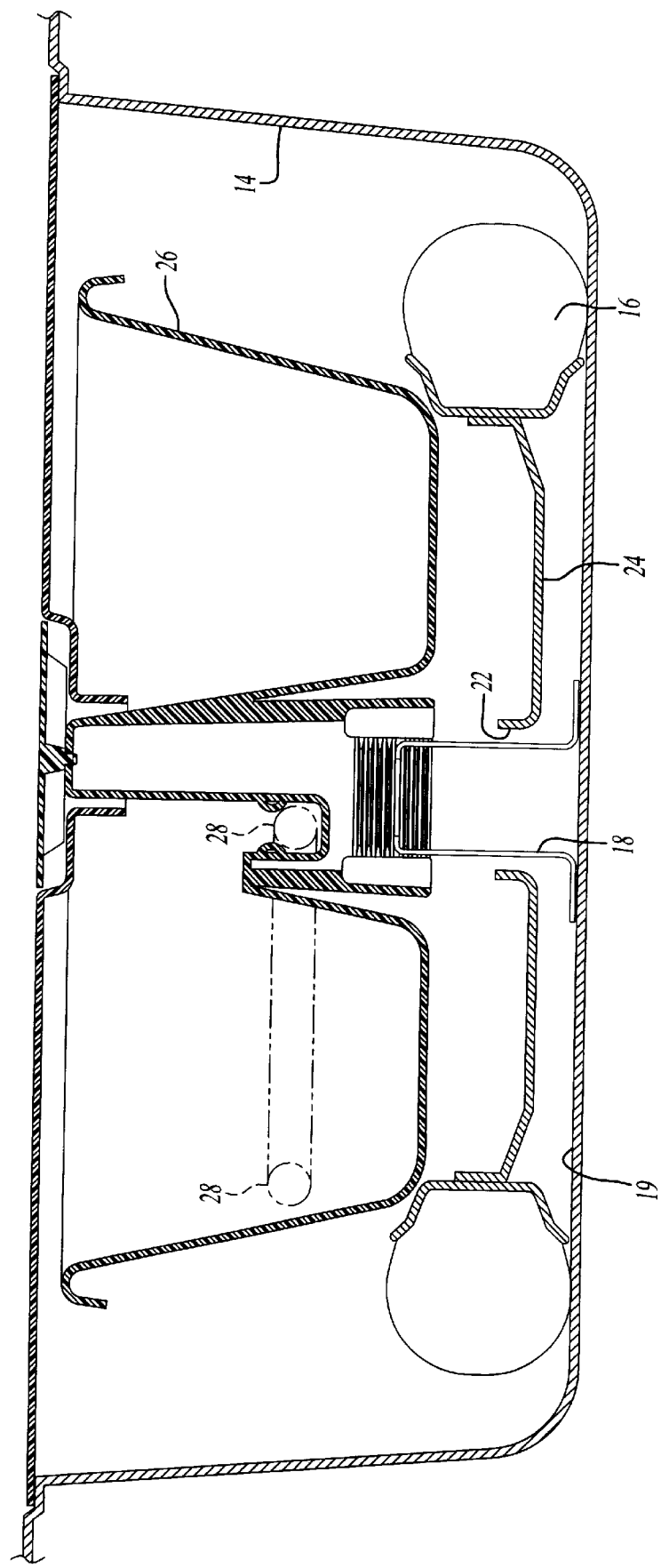
FIG. 2 is an axial sectional view illustrating the preferred embodiment of the invention.

With reference now to FIGS. 1 and 2, an inverted and generally U-shaped bracket 18 is secured to the bottom 19 of the wheel well 14 so that the bracket 18 extends upwardly through an axial opening 22 on the hub 24 of the spare tire 16. As best shown in FIG. 1, this bracket 18 includes two outwardly and diametrically opposed tabs 20 for a purpose to be subsequently described.

Still referring to FIGS. 1 and 2, the jack storage assembly 10 further includes a bucket 26 adapted to contain an automotive jack 28 within its interior. The bucket 26, furthermore, is preferably of a one-piece plastic construction for inexpensive yet durable construction.

Figure 4:
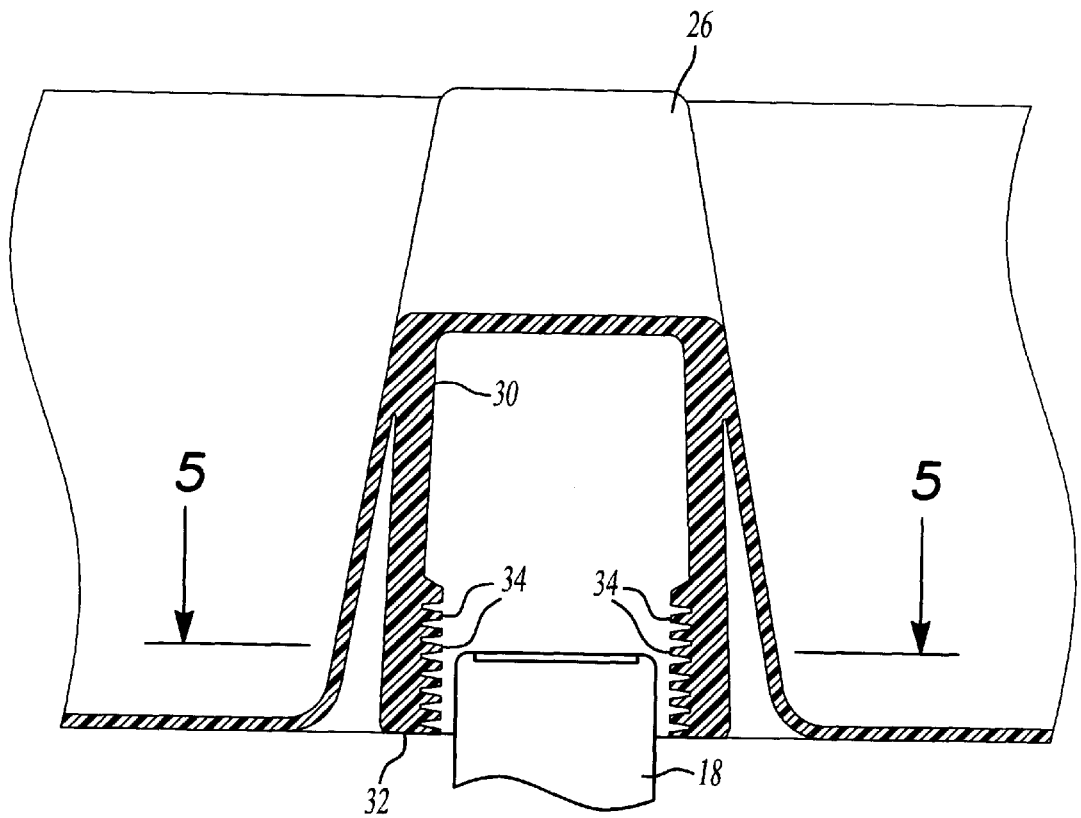
FIG. 4 is a fragmentary sectional view illustrating a further portion of the preferred embodiment of the present invention.
Figure 5:
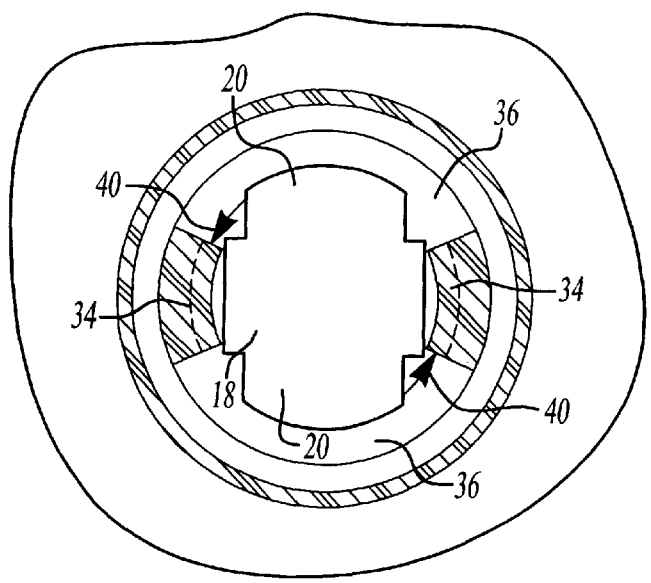
FIG. 5 is a view taken substantially along line 5—5 in FIG. 4.

As best shown in FIGS. 4 and 5, the bucket 26 includes an axially extending bore 30 which is open at its lower end 32. A plurality of longitudinally spaced annular ribs 34 are provided along the interior of the bore 30. As best shown in FIG. 5, a pair of axially extending channels 36 are formed through the ribs 34 so that the ribs 34 are divided into two opposed segments. Furthermore, the channels 36 are dimensioned so that, with the tabs 20 of the bracket 18 in alignment with the recesses 36, the bracket 18 is freely axially slidably received within the bore 30.

With reference now to FIGS. 2 and 5, with the spare tire 16 positioned within the wheel well 14 and the bucket 26 positioned so that the tabs 20 are in alignment with the channels 36, the bucket 26 is moved to the position illustrated in FIG. 2 in which the lower end of the bucket 26 abuts against the spare tire 16. The bucket 26 is then rotated 90 degrees, as indicated by arrows 40 (FIG. 5) thus moving the bracket tabs 20 in between adjacent ribs 24 in the bucket bore 30. In doing so, the interaction between the bracket tabs 20 and the ribs 34 effectively locks the bucket 26 against axial movement to the bracket 18 and simultaneously snugly secures the tire 16 and bucket 26 to the bracket 18 within the wheel well 14. However, when desired, the bucket 26 may be easily removed from the bracket 18 by merely again rotating the bucket 26 until the tabs 20 are again in alignment with the channels 36 whereupon the bucket 26 can be easily removed from the bracket 18.

Figure 3:
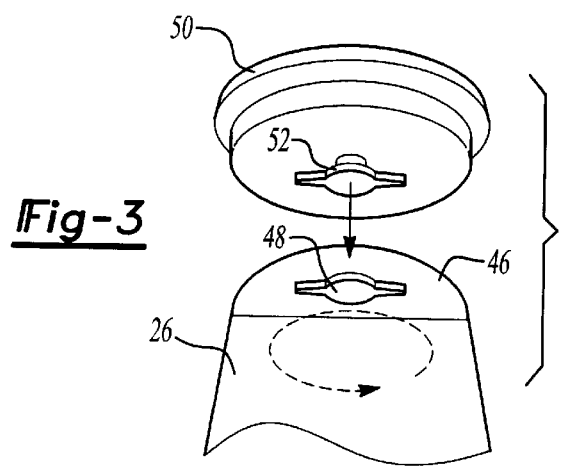
FIG. 3 is a fragmentary exploded view illustrating one portion of the preferred embodiment of the present invention.

With reference now to FIGS. 1 and 3, a cover 42 is dimensioned to overlie and cover both the bucket 26 and spare tire 16 when the spare tire 16 and bucket 26 are positioned within the wheel well 14. The cover 42 includes an opening 44 which registers with the top 46 of the bucket 26.

A bayonet opening 48 is formed through the upper end 46 of the bucket 26 while a fastener 50 having a bayonet coupling 52 is dimensioned to be received within the bayonet 48. Thus, with the cover 42 overlying the bucket 26 and spare tire 16, insertion of the bayonet coupling 52 of the fastener 50 into the opening 48 and rotation of the fastener 50 detachably secures the fastener 50 to the bucket 26 with the cover 42 sandwiched in between the fastener 50 and bucket 26.

From the foregoing, it can be seen that the present invention provides a simple and yet effective jack storage assembly for use with automotive vehicles. A primary advantage of the present invention is that the jack assembly can be utilized with spare tires having different thicknesses since the ribs within the bucket bore enable the bucket 26 to be detachably connected to the bracket 18 in longitudinally adjustable positions. Furthermore, the simple bayonet coupling between the fastener 50 and the bucket 26 enables simple and rapid detachment and securement of the fastener to the bucket 26 as required.

Having described my invention, however, many modifications thereto will become apparent to those skilled in the art to which it pertains without deviation from the spirit of the invention as defined by the scope of the appended claims.

I claim:

1. For use in conjunction with an automotive vehicle having a wheel well for storage of a spare tire, said wheel well having a bracket over which the spare tire is positioned, a jack storage assembly comprising:
    a bucket adapted to contain a jack,
    means integrally formed with said bucket for detachedly securing said bucket to said bracket so that the spare tire is sandwiched in between said bucket and the wheel well,
    a cover adapted to overlie said bucket and said spare tire,
    means for detachedly securing said cover to said bucket.

2. The invention as defined in claim 1 wherein said bucket is made of plastic.

3. For use in conjunction with an automotive vehicle having a wheel well for storage of a spare tire, said wheel well having a bracket over which the spare tire is positioned, a jack storage assembly comprising:
    a bucket adapted to contain a jack,
    means for detachably securing said bucket to said bracket so that the spare tire is sandwiched in between said bucket and the wheel well,
    a cover adapted to overlie said bucket and said spare tire,
    means for detachably securing said cover to said bucket,
    wherein said bracket includes at least one outwardly extending tab, and wherein said bucket comprises an axial bore open at one end and having a plurality of longitudinally spaced ribs formed in said bore, an axially extending channel formed through said ribs, said channel being dimensioned so that, with said bracket tab in registration with said channel, said bracket is freely slidably received in said bucket bore, and wherein said ribs are dimensioned so that, with said bracket positioned in said bucket bore, rotation of said bucket positions said bracket tab between adjacent ribs thereby locking said bucket to said bracket against axial movement.

4. For use in conjunction with an automotive vehicle having a wheel well for storage of a spare tire, said wheel well having a bracket over which the spare tire is positioned, a jack storage assembly comprising:
    a bucket adapted to contain a jack,
    means for detachably securing said bucket to said bracket so that the spare tire is sandwiched in between said bucket and the wheel well,
    a cover adapted to overlie said bucket and said spare tire,
    means for detachably securing said cover to said bucket,
    wherein said bracket includes at least two opposed tabs and wherein said bucket includes two channels formed through said ribs, said channels dimensioned to register with said tabs.

5. For use in conjunction with an automotive vehicle having a wheel well for storage of a spare tire, said wheel well having a bracket over which the spare tire is positioned, a jack storage assembly comprising:
    a bucket adapted to contain a jack,
    means for detachably securing said bucket to said bracket so that the spare tire is sandwiched in between said bucket and the wheel well,
    a cover adapted to overlie said bucket and said spare tire,
    means for detachably securing said cover to said bucket,
    where said bucket includes a bayonet opening in its end opposite from said bucket bore, and wherein said means for securing said cover to said bucket comprises a fastener having a bayonet coupling insertable into said bayonet opening so that, upon insertion and rotation of said fastener into said bayonet opening, said fastener is detachably secured to said bucket, said cover being sandwiched between said fastener and said bucket.

* * * * *